United States Patent
Krugfahrt et al.

(10) Patent No.: US 12,467,841 B2
(45) Date of Patent: Nov. 11, 2025

(54) METHOD AND RHEOMETER FOR MEASURING THE VISCOSITY OF A SPECIMEN

(71) Applicant: Anton Paar GmbH, Graz-Strassgang (AT)

(72) Inventors: Andreas Krugfahrt, Maria Lankowitz (AT); Stefan Bauer, Seiersberg (AT); Johannes Zach, Sankt Marein bei Graz (AT)

(73) Assignee: Anton Paar GmbH, Graz-Strassgang (AT)

( * ) Notice: Subject to any disclaimer, the term of this patent is extended or adjusted under 35 U.S.C. 154(b) by 39 days.

(21) Appl. No.: 18/161,200

(22) Filed: Jan. 30, 2023

(65) Prior Publication Data

US 2023/0273106 A1    Aug. 31, 2023

(30) Foreign Application Priority Data

Jan. 28, 2022  (AT) .............................. A50041/2022

(51) Int. Cl.
G01N 11/14        (2006.01)

(52) U.S. Cl.
CPC ..................... G01N 11/14 (2013.01)

(58) Field of Classification Search
CPC ............. G01N 11/14; G01N 2011/002; G01N 11/142; G01N 11/16; G01N 11/00; G01N 2011/145; G01N 2011/147

(Continued)

(56) References Cited

U.S. PATENT DOCUMENTS 3,307,619 A  *  3/1967  Kim ..................... G01N 11/142
                                                      165/47
3,435,666 A  *  4/1969  Fann ..................... G01N 11/14
                                                     73/54.32

(Continued)

FOREIGN PATENT DOCUMENTS

| AT | 513661 A1 * | 6/2014 | ............. G01N 11/00 |
| EP | 3067684 B1 * | 2/2021 | ............... F16J 15/40 |
| JP | 2022079396 A * | 5/2022 | |

OTHER PUBLICATIONS

Copt of translation for AT 513661 document listed above; Oct. 8, 2024.*

*Primary Examiner* — Robert R Raevis
(74) *Attorney, Agent, or Firm* — Laurence A. Greenberg; Werner H. Stemer; Ralph E. Locher (57) ABSTRACT

A rheometer and a method for measuring viscosity of a specimen include a motor-driven measuring shaft, a first measuring part fastened to the shaft, a second measuring part below the first measuring part, the measuring parts defining a measuring gap receiving the specimen and having a thickness set by the measuring parts. A heating or temperature-control unit below the second measuring part temperature-controls the second measuring part. The measuring parts rotate or rotate-oscillate relative to each other about an axis. A hood has an internal contour at the second measuring part and/or the heating or temperature-control unit. The internal contour surrounds and covers the first measuring part and the measuring gap and forms a measuring space. A duct near the temperature-control unit opens into the space, allowing the temperature-control unit to control a temperature of temperature-control medium in the duct.

23 Claims, 2 Drawing Sheets

(58) Field of Classification Search
USPC ............ 73/54.01, 54.28–54.35, 54.42, 54.43
See application file for complete search history.

(56) References Cited

U.S. PATENT DOCUMENTS

| | | |
|---|---|---|
| 6,571,610 B1 | 6/2003 | Raffer |
| 6,752,001 B1 * | 6/2004 | LaPointe ................ G01N 19/02 |
| | | 73/10 |
| 2022/0011211 A1 * | 1/2022 | Schuetz ............... G01N 11/162 |

* cited by examiner

METHOD AND RHEOMETER FOR MEASURING THE VISCOSITY OF A SPECIMEN

CROSS-REFERENCE TO RELATED APPLICATION

This application claims the priority, under 35 U.S.C. § 119, of Austria Patent Application A50041/2022, filed Jan. 28, 2022; the prior application is herewith incorporated by reference in its entirety.

FIELD AND BACKGROUND OF THE INVENTION

The present invention relates to a method for measuring the viscosity of a specimen with a rheometer, in particular configured as a rotational rheometer, or viscometer, wherein a measuring motor of the rheometer drives in a rotating manner a measuring shaft to which an in particular plate-shaped or cone-shaped first measuring part is fastened, a measuring gap in which the specimen to be examined is incorporated is disposed between the first measuring part and an in particular rotationally fixed, preferably plate-shaped second measuring part that is disposed below the first measuring part, the height of the measuring gap is set by adjusting the two measuring parts relative to each other, and a temperature-control unit by way of which the temperature of the second measuring part is able to be pre-defined is disposed below the second measuring part, and the first measuring part and/or the second measuring part are/is driven in a rotating or rotating-oscillating manner relative to each other about the common axis.

The invention also relates to a rheometer, in particular a rotational rheometer, for measuring the viscosity of a specimen, including a measuring motor which drives, in a rotating manner, a measuring shaft to which an in particular plate-shaped or cone-shaped first measuring part is fastened, a measuring gap into which the specimen to be examined is able to be incorporated is disposed between the first measuring part and an in particular rotationally fixed, preferably plate-shaped second measuring part that is disposed below the first measuring part, the thickness of the measuring gap is able to be set by adjusting the two measuring parts relative to each other, and a heating or temperature-control unit by way of which the second measuring part is able to be temperature-controlled is disposed below the second measuring part, and the first measuring part and the second measuring part are able to be driven in a rotating or rotating-oscillating manner relative to each other about the common axis.

A multiplicity of viscometers and/or rheometers, in particular rotational rheometers, by way of which the viscosity of various specimens is determined are known from the prior art. To that end, two measuring parts are positioned so as to be opposite each other, and a measuring gap between the first and the second measuring parts is configured in that manner. The specimen is then incorporated in the measuring gap, and the first measuring part is driven in a rotating manner relative to the second measuring part, the viscosity of the specimen being determined by way of the measurement and/or the parameter of the required angle of rotation and/or torque. The temperature of the specimen is a substantial variable in the rheological measurement of specimens. To that end, the specimen is temperature-controlled from below during cone-plate measuring, or plate-plate measuring, respectively, by using a fluid temperature control, a resistance heating and/or a Peltier plate. Without an active temperature-controlling hood, a steep gradient is created in the specimen when measuring above room temperature, the measurement result therefore being distorted.

Devices and methods in which the measuring space, or the two measuring parts, is/are disposed within a hood, the latter covering the measuring space in relation to the environment, are known from the prior art, for example from Austrian Patent Application AT 513661 A1 or U.S. Pat. No. 6,571,610 B1. In that instance, heating and/or cooling elements which set the temperature in the measuring space and in that manner reduce the temperature gradient within the specimen, or the measuring space, respectively, are disposed within the hood.

The disadvantage of the devices and methods known from the prior art is that the latter are very complex and expensive, and therefore uneconomical for measurements using rheometers in the lower price segment, or in simple experimental setups, respectively.

SUMMARY OF THE INVENTION

It is accordingly an object of the invention to provide a method and a rheometer for measuring the viscosity of a specimen, which overcome the hereinafore-mentioned disadvantages of the heretofore-known methods and rheometers of this general type, with which known rheometers can easily be adapted, and with which the temperature gradient within the measuring space, or the specimen, respectively, can easily be reduced without implementing a complex and expensive construction.

With the foregoing and other objects in view it is provided, in accordance with the invention, that:

the rheometer has a hood which, on the internal contour thereof, is preferably configured so as to be rotationally symmetrical and bears on the second measuring part and/or the temperature-control unit and surrounds and covers the upper measuring part and the measuring gap, in particular additionally the second measuring part, and forms a measuring space;

the rheometer has a duct, in particular an annular duct, which is disposed in the region of the temperature-control unit, wherein, by way of the duct, in particular the annular duct, a temperature-control medium is incorporated into the measuring space, in particular by way of at least one entry opening, and is dissipated from the hood by way of at least one exit opening; and the duct is disposed in such a manner that the temperature-control medium in the duct, in particular in the annular duct, is temperature-controlled by the temperature-control unit and in this manner, when flowing through the measuring space, effects uniform temperature-controlling of the first measuring part, of the specimen, and of the second measuring part.

In the context of this application, "temperature-controlling" is understood to mean that a quantity of heat can be dissipated from the measuring space or also supplied to the latter, respectively, thus the temperature of the specimen and of the first measuring part can be increased or reduced.

In the context of the present invention, rheometers are understood to be any measuring apparatuses which measure the rheological properties of specimens. In this way, rheometers can also be configured as viscometers or rotational rheometers, for example. The latter can optionally also contain density measuring apparatuses such as flexural resonators or be combined with the latter.

Due to the simple configuration of the hood which covers the measuring space, or the first measuring part and the second measuring part and thus covers the measuring gap, respectively, the heat of the temperature-control unit can be favorably distributed in the measuring space, or introduced into the latter, by way of the temperature-control medium, and the temperature gradient within the measurement setup can in this manner be reduced with a low degree of complexity.

In the context of the present application, a hood is understood to be of any shape which covers the measuring space in relation to the environment and in this manner enables a separation between the measuring space and the environment of the rheometer or of the measuring space, respectively. The hood in this case can be configured in the shape of a dome, for example, or as a hemisphere, but the term "hood" is not to be understood to be limiting; rather, the hood may assume any arbitrary external shape, for example it may be configured in a star-shaped manner; however, it is important that the inner contour of the hood follows the contour of the first measuring part. The heat of the temperature-control unit can thus easily circulate within the measuring space by way of the temperature-control medium, and in this way the temperature of the specimen and of the first measuring part and of the second measuring part can be kept constant, or the temperatures can be adapted, respectively.

In order to achieve a preferred flow within the measuring space, it can be provided that the temperature-control medium is deflected in the measuring space, in particular at an angle of 15° to 25°, when viewed from the measuring gap toward the rotation axis of the first measuring part, in such a manner that swirling of the temperature-control medium in the measuring space is effected.

It can advantageously be provided that the hood has a thermal conduction portion, in particular formed of metal, which partially covers the inside of the hood and, on the inside of the hood, is directed into the interior of the measuring space, wherein the thermal conduction portion of the hood is connected in a thermally-conducting manner to the temperature-control unit, in particular bears on the temperature-control unit, in such a way that heat from the temperature-control unit is transported into the interior of the measuring space by way of the thermal conduction portion. Due to the configuration of the hood having a heated conduction portion, the thermal energy from the temperature-control unit can readily be directed into the material of the hood and in this manner heat in the interior of the measuring space can be dispensed to the first measuring part and/or the specimen, or heat can be received from the latter, respectively.

A further aspect of the present invention provides that a rheometer for measuring the viscosity of a specimen is provided. The rheometer in this case is to implement a simple construction and to complement in a relatively cost-effective manner existing rheometers, or to thermally close off the measuring space in relation to the environment in a simple manner.

With the objects of the invention in view, it is accordingly provided that;

the rheometer has a hood which, on the internal contour thereof, is preferably configured so as to be rotationally symmetrical and bears on the second measuring part and/or the heating or temperature-control unit, respectively, and surrounds and covers the upper measuring part and the measuring gap, in particular additionally the second measuring part, and forms a measuring space;

the rheometer has a duct, in particular an annular duct, which is disposed in the region of the temperature-control unit and, opens into the measuring space, in particular by way of entry openings; and the duct, in particular the annular duct, is disposed and configured in such a manner that the temperature-control medium in the duct, in particular the annular duct, is able to be temperature-controlled by the temperature-control unit.

Due to the configuration of the rheometer according to the invention having a hood which covers the measuring space, the thermal transport from the measuring gap, or the measuring space, respectively, into the environment is effectively precluded, and furthermore heat is incorporated into, or dissipated from, the measuring space by way of the temperature-control medium, in a controlled manner.

In order to be able to easily distribute the temperature-control medium in the measuring space, it can be provided that a circular gap which is configured as an exit opening for the temperature-control medium is configured between the hood and the cylindrical stem of the first measuring part by way of which the first measuring part is fastened to the measuring shaft and/or the measuring shaft, the circular gap separating the two components. Due to the dissipation of the temperature-control medium between the cylindrical stem of the first measuring part, it is effected that the temperature-control medium is positively distributed in the measuring space and circulates in the latter, and thereafter can be readily dissipated by way of the exit opening. A potential pressure increase within the measuring space is thus prevented, and simple transportation of the temperature-control medium through the measuring space is effected.

It can advantageously be provided that the hood has a thermal conduction portion, in particular formed of metal, which partially covers the inside of the hood and, on the inside of the hood, is directed into the interior of the measuring space, wherein the thermal conduction portion of the hood is connected in a thermally conducting manner to the temperature-control unit, in particular bears on the temperature-control unit, in such a way that heat from the temperature-control unit is able to be transported into the interior of the measuring space by way of the thermal conduction portion. Heat from the temperature-control unit is transported to the inside of the hood by way of the heat conduction portion, or heat is effectively guided out of the measuring space in the opposite direction by way of the heat conduction portion, respectively. In this instance, the heat can be simply radiated into the measuring space by way of the inside of the hood and the heat conduction portion, for example, and a further thermal input into the measuring space can therefore be achieved in addition to the temperature-control medium.

In order to be able to easily position the hood about the first measuring part, it can be provided that the hood is configured in at least two parts, in particular so as to be divisible along the central axis, wherein the parts, in particular the halves, of the hood are configured so as to be able to be connected in a form-locking manner, preferably plugged into each other, in particular by way of a plug connection. The separable hood, or hood configured in multiple parts, respectively, can in this way be easily disposed about the first measuring part, and the individual parts can be plugged together; conversely, the hood can first be plugged together and thereafter positioned. In this way, simple assembling of the hood can also be achieved on existing rotational rheometers. To this end, a measuring part configured for receiving the hood can optionally be assembled on existing rheometers with an interchange plate.

A particularly effective thermal transport through the measuring space, or a preferred input or output of heat into/from the measuring space, respectively, is achieved in that the contour of the inside of the hood is adapted to the external contour of the first measuring part and follows the external contour in such a manner that, along the axis and/or the contour of the first measuring part, a substantially consistent spacing, in particular of 0.5 mm to 1.2 mm, in particular in the flow direction of the temperature-control medium, is present between the hood and the first measuring part.

It can preferably be provided that the second measuring part is configured as a screw-on plate which is configured so as to be able to be screwed directly onto the temperature-control unit.

Particularly advantageous transportation of the temperature-control medium in the region of the temperature-control unit can be provided in that the duct, in particular the annular duct, is configured in the temperature-control unit and/or the second measuring part, and is preferably disposed so as to be concentric with the rotation axis of the first measuring part.

Preferred swirling of the temperature-control medium within the measuring space can be achieved in that the hood is configured so as to be rotationally symmetrical, wherein the duct is configured as an annular duct in which the temperature-control medium is able to circulate, wherein the annular duct is connected to the measuring space by way of a number of entry openings disposed between the second measuring part and the hood, wherein the hood in the region of the entry openings is configured in such a manner that the temperature-control medium in the measuring space is deflected in such a way that swirling of the temperature-control medium in the measuring space is able to be effected.

A particularly preferred flow of the temperature-control medium within the measuring space is achieved in that the hood in the region of the entry openings has a wall portion which, viewed from the measuring gap toward the rotation axis of the first measuring part, is inclined at an angle of 15° to 25°.

In order to achieve a simple connection between the hood and the rheometer, or the second measuring part or the temperature-control unit, respectively, it can be provided that the second measuring part or the temperature-control unit has a receptacle recess, in particular an annular groove, into which the hood is able to be incorporated by way of the lower side thereof, wherein the hood is coupled to the temperature-control unit in a thermally conductive manner. In this way, the hood can easily be placed on the second measuring part or the temperature-control unit, and an effective delimitation of the environment of the rheometer, or of the measuring space, respectively, in relation to the measuring space can be achieved.

It can be advantageously provided that the hood is composed of a material with a high thermal conductivity, in particular a metal.

In order to be able to particularly easily achieve an insulation of the measuring space in relation to the environment, it can be provided that the hood is surrounded by a thermal insulation material, or a which thermally insulates the measuring space and/or the thermal conduction portion in relation to the environment of the hood. Due to the insulation of the measuring space in relation to the environment by a further thermal insulation material, the transport of temperature or heat, respectively, into the measuring space, or out of the latter, is configured to be particularly effective without the ambient temperature significantly influencing the measurement.

Other features which are considered as characteristic for the invention are set forth in the appended claims.

Although the invention is illustrated and described herein as embodied in a method and a rheometer for measuring the viscosity of a specimen, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figures 1, 2:
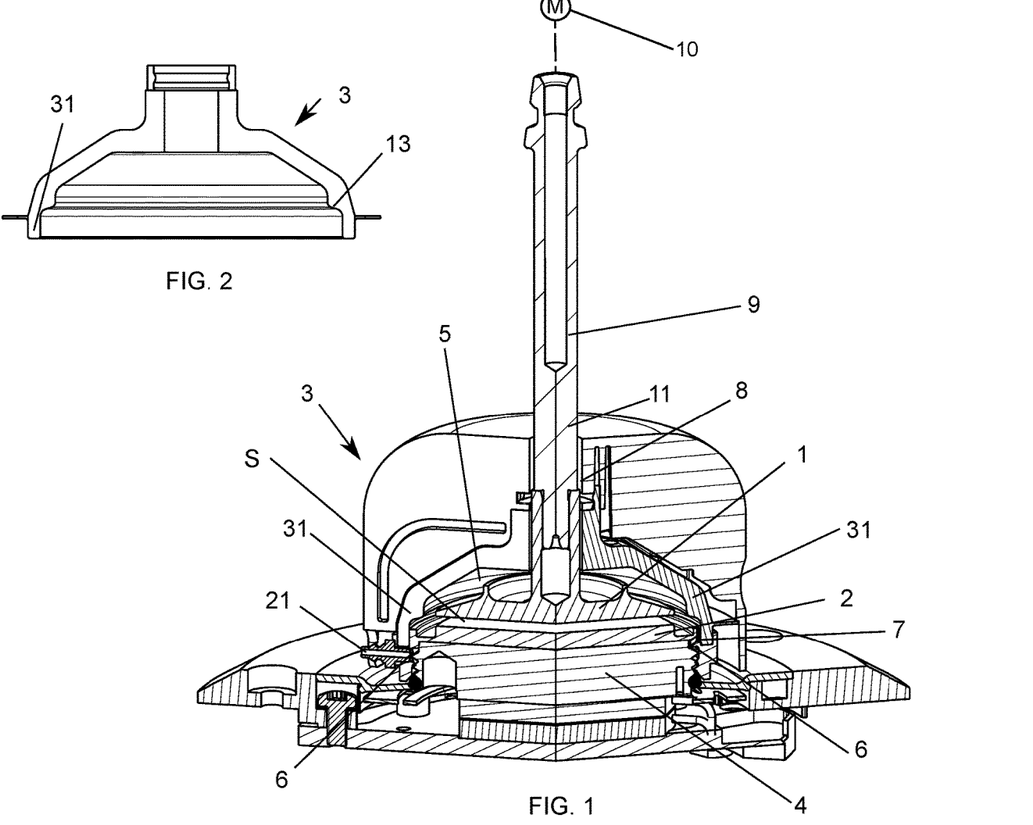
FIG. 1 is a diagrammatic, sectional view of the measurement setup of a rheometer according to the invention.
FIG. 2 is a sectional view of a hood according to the invention.
Figure 1A:
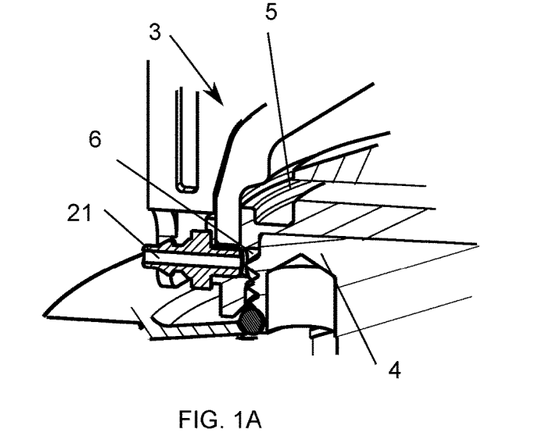
FIGS. 1a and 1b are enlarged, fragmentary views of a duct.

Referring now to the figures of the drawings in detail and first, particularly, to FIG. 1 thereof, there is seen a part of a rheometer according to the invention, which is depicted in a sectional view. The rheometer in this case is not completely illustrated and is configured as a so-called rotational rheometer. The rheometer includes a measuring motor 10 which can drive a measuring shaft 9 in a rotating manner. A first measuring part 1 is fastened to the measuring shaft 9. A second measuring part 2 is disposed below the first measuring part 1, wherein a measuring gap S is configured between the first measuring part 1 and the second measuring part 2. When carrying out the examinations, the specimen is incorporated in the measuring gap S, or in the spacing between the first measuring part 1 and the second measuring part 2, respectively, and the measuring gap S is set by adjusting the two measuring parts 1, 2 relative to each other. A temperature-control unit 4, by way of which the second measuring part 2 is able to be temperature-controlled, is disposed below the second measuring part 2. In the context of the invention, "able to be temperature-controlled" is understood to mean that the temperature of the second measuring part 2 can be raised or lowered, thus the quantity of heat can be incorporated by way of the temperature-control unit 4 or dissipated by the latter. The measuring shaft 9 and thus the first measuring part 1 are driven in a rotating manner by the measuring motor 10 of the rheometer, and the first measuring part 1 in this way moves relative to the second measuring part 2 so as to rotate about the common axis of the measuring parts 1, 2, or else moved in a rotating-oscillating manner relative to each other, depending on the experiment.

Figure 1B:
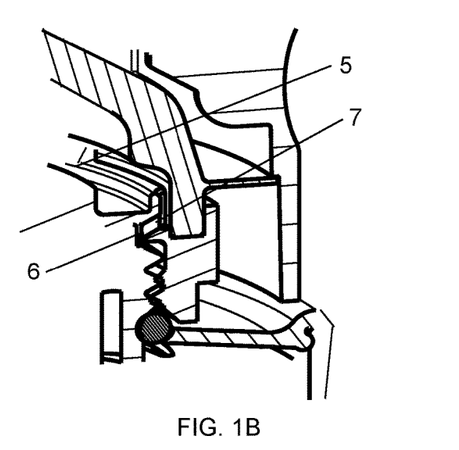

The rheometer furthermore has a hood 3 which, in this embodiment, is placed on the second measuring part 2 and surrounds the upper, or the first, measuring part 1 and the measuring gap S, and additionally those parts of the second measuring part 2 that are disposed in the region of the measuring gap S. The hood 3 has the effect that the measurement setup is covered, forming a measuring space 5 (below the hood 3). The temperature-control unit 4 effects heating or cooling of the second measuring part 2 and thus a thermal input or a thermal output from the specimen in the measuring gap S. The rheometer furthermore has an inlet 21 by way of which a temperature-control medium is incorporated into a duct configured as an annular duct 6. The temperature-control medium can then circulate within the annular duct 6 and receive heat from the temperature-control unit 4 or dissipate heat to the latter. The heated or cooled temperature-control medium from the annular duct 6 flows, by way of entry openings 7 (FIG. 1b), into the measuring space 5 and is distributed in the latter (FIG. 1b). The annular duct 6 in this case is disposed completely around the temperature-control unit 4 in such a way that the temperature-control medium can circulate in the annular duct 5 and particularly effectively absorbs heat from the temperature-control unit 4. A circular gap which serves as an exit opening 8 for the temperature-control medium from the measuring space 5 is configured between the hood 3 and a cylindrical stem 11 of the measuring shaft 9, on which the first measuring part 1 is fastened to the measuring shaft 9, and the first measuring part 1, the circular gap separating the hood 3 from these components.

A preferred exemplary embodiment of the method according to the invention will be described hereunder by using FIG. 1.

In order to examine the viscosity of a specimen, the specimen is positioned on the second measuring part 2, and the first measuring part 1 is thereafter disposed above the second measuring part 2 at a spacing that defines the measuring gap S. Thereafter, the hood 3 is positioned above the first measuring part 1, the second measuring part 2 and the measuring gap S in such a way that the hood 3 forms the measuring space 5 and covers the latter in relation to the environment. Thereafter, the temperature-control unit 4 is temperature-controlled, thus heated for example, and the temperature of the second measuring part 2 and of the specimen is increased in this way. A temperature-control medium, for example air or a gas, is incorporated into the annular duct 6 by way of the inlet 21, and heat is in this manner absorbed by the temperature-control medium in the annular duct 6. The temperature-control medium thereafter flows into the measuring space 5 by way of the inlet openings 7, and effects uniform temperature-controlling of the first measuring part 1, of the second measuring part 2 and of the specimen, as a result of which the temperature gradient within the measuring space 5 is reduced. The temperature-control medium circulates in the measuring space 5 and is dissipated from the measuring space 5 by way of the exit opening 8 along the stem 11 of the measuring shaft 9. In this way, by way of the method according to the invention, it is possible to effect a uniform distribution of temperature within the measurement setup and to implement a simple construction in the process.

When the measuring motor 10 of the rheometer is thereafter activated, the measurement of the specimen, or the determination of the viscosity of the specimen, respectively, can be carried out. Alternatively, the measuring motor 10 may also already have been started before temperature-controlling takes place and the temperature-control medium is introduced.

As illustrated in the preferred embodiment of FIGS. 1 to 5, the hood 3 can have a heat conduction portion 31 which at least partially covers the inside of the hood 3 and is directed into the interior of the measuring space 5. The heat conduction portion 31 bears on the lower, second measuring part 2 and directly absorbs heat from the second measuring part 2 and then directs it into the measuring space 5. The heat conduction portion 31 in the embodiment of FIG. 1 is disposed across the entire area about the measuring space 5 but may optionally also form only parts of the hood 3 (FIG. 2). The heat conduction portion 31 in the embodiment of FIGS. 1 and 2 is formed of metal, in particular from copper or aluminum, and in this manner can particularly advantageously distribute the heat generated by the temperature-control unit 4 within the hood 3 and particularly easily dissipate the heat to the measuring space 5. The combination of the configuration having the heat conduction portion 31 and the temperature-control medium effects a particularly positive distribution of heat within the measuring space 5 and, therefore, very effective temperature-controlling of the measurement setup.

Optionally, it can be provided that the heat conduction portion 31 is placed directly on the temperature-control unit 4, or bears on the latter, and absorbs heat directly from the temperature-control unit 4 or dissipates heat directly to the latter.

Figure 3:
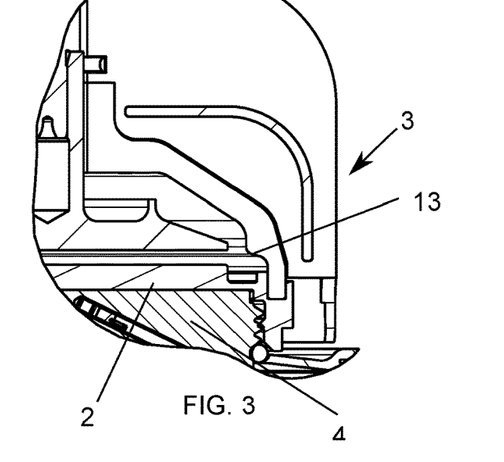
FIG. 3 is a fragmentary view of the hood and of the measurement setup.

As is illustrated in FIG. 3, the contour of the inside of the hood 3 in the embodiment of FIGS. 1 to 5, thus the heat conduction portion 31, is adapted to the external contour of the first measuring part 1 and follows the latter. The spacing in terms of the axis of the first measuring part 1 is thus approximately constant. The external contour of the first measuring part 1 and the inside, or the internal contour, respectively, of the hood 3 are thus disposed so as to be at a substantially consistent mutual spacing from one another, wherein this spacing is preferably between 0.5 mm and 1.2 mm, in such a way that, in the flow direction of the temperature-control medium, there is a constant flow pattern that penetrates an always identical or approximately identical space.

As is illustrated in FIGS. 1 to 5, the second measuring part 2 is preferably configured as a screw-on plate which is screwed directly onto the temperature-control unit 4. Due to the configuration of the second measuring part 2 as a screw-on plate, a particularly positive conduction of heat from the temperature-control unit 4 to the second measuring part 2 is achieved, and the geometry of the second measuring part can be easily changed. As is illustrated in FIGS. 1 to 5, the annular duct 6 advantageously also forms part of the screw-fitting of the screw-on plate, or also extends into the screw-fitting, respectively, in such a way that the annular duct 6 can easily be configured with the screw-fitting.

As an alternative to the preferred embodiments illustrated in FIGS. 1 to 5, a simple duct can be provided instead of the annular duct 6, the simple duct leading into the temperature-control unit 4 and/or the second measuring part 2, for example, or, in the proximity of the latter, absorbing the quantity of heat from the temperature-control unit 4 and/or the second measuring part 2.

As is illustrated in FIGS. 1 and 2, the hood 3 is preferably configured so as to be rotationally symmetrical, and the annular duct 6 in which the temperature-control medium circulates is disposed concentrically in the axis of the hood 3. The annular duct 6 has a number of entry openings 7 which are disposed between the second measuring part 2 and the hood 3 and, as is shown in FIG. 1*b*, open into the measuring space 5. The entry openings 7 in this case, as is illustrated in FIG. 4, can be distributed uniformly across the circumference of the second measuring part 2, the latter likewise being configured so as to be rotationally symmetrical, and in this manner can achieve a particularly favorable entry direction, or a particularly favorable entry angle, respectively, of the temperature-control medium into the measuring space 5 in such a way that swirling of the temperature-control medium in the measuring space 5 is generated.

Optionally, the hood 3, as is illustrated in FIG. 3, in the region of the entry openings 7 can have a wall portion 13 which, when viewed from the measuring gap S toward the rotation axis of the first measuring part 1, is inclined at an angle of between 15° and 25°. In the embodiment of FIG. 3, the wall portion 13 is configured to have an opening angle a of 16.2°, and, at the beginning and the end of the wall portion 13, has radii which are in the range between 1 and 2 mm. Due to the configuration of the wall portion 13 using the opening angle a between 15 and 25°, a preferred induction of the temperature-control medium to the first measuring part 1 and the measuring gap S is effected in such a way that an advantageous thermal transfer between the first measuring part 1, the measuring gap S and the temperature-control medium is achieved.

Figures 3A, 5:
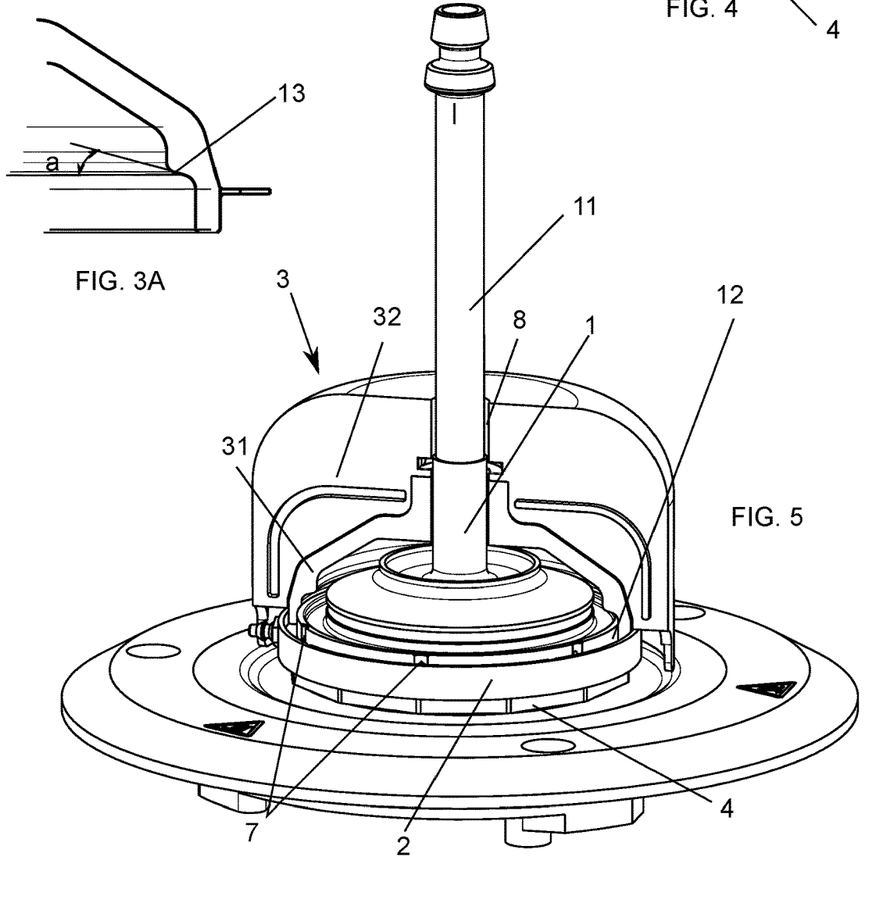
FIG. 3a is a further fragmentary view of the hood.
FIG. 5 is a perspective view of a measuring space having a cut-away hood.
Figure 4:
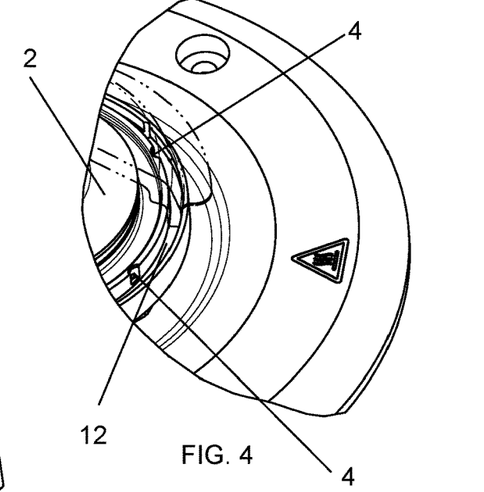
FIG. 4 is a fragmentary view having entry openings.

As is illustrated in FIGS. 3 to 5, the second measuring part 2 and/or the temperature-control unit 4 can have a receptacle recess into which the hood 3 is incorporated by way of the lower side thereof. The receptacle recess in this embodiment is configured as an annular groove 12 in such a way that the hood 3, or thermal conduction portion 31, respectively, bears on the second measuring part 2, or the hood 3 is plugged into the annular groove 12, respectively, and in this manner a particularly favorable thermal coupling between the hood 3 and the temperature-control unit 4, or the first measuring part 1, respectively, is achieved.

In the preferred embodiments illustrated in FIGS. 1 to 5, the hood 3 per se is composed of a material having a high thermal conductivity, or has a thermal conduction portion 31 formed of metal. As is shown in FIGS. 1 to 5, the hood 3 can optionally be surrounded by a thermal insulation material 32, or the hood 3 per se can include a thermal insulation material 32. Due to the thermal insulation material 32, the measuring space 5 and the thermal conduction portion 31 are thermally insulated in relation to the environment, thus causing a lower investment in terms of energy, or a lower requirement of heat, respectively, in order for the measuring space 5 or of the measurement setup, respectively, to be uniformly temperature-controlled.

In order to achieve a better positioning of the hood 3, the latter, in a preferred embodiment which is not illustrated, can be configured in multiple parts. In this way the hood 3 can be configured so as to be divided along the central axis, for example, and to be able to be connected again in a form-locking manner by way of plug connections. This has the effect that the hood 3, upon positioning of the first measuring part 1, can be disposed above the measurement setup and in this way easy assembly is effected. In this way, the hood 3, upon positioning of the measurement setup, can be plugged together and then be positioned in the annular groove 12, for example, as a result of which an always defined spacing between the hood 3 and the first measuring part 1 is particularly positively achieved.

The invention claimed is:

1. A method for measuring a viscosity of a specimen with a rheometer or rotational rheometer or viscometer, the method comprising:
   using a measuring motor of the rheometer to rotationally drive a measuring shaft fastened to a first measuring part;
   placing the specimen to be examined in a measuring gap between the first measuring part and a second measuring part disposed below the first measuring part;
   adjusting the first and second measuring parts relative to each other to set a height of the measuring gap;
   using a temperature-control unit disposed below the second measuring part to control a temperature of the second measuring part;
   driving at least one of the first measuring part or second measuring part in a rotating or rotating-oscillating manner relative to each other about a common axis;
   placing an internal contour of a hood of the rheometer against at least one of the second measuring part or the temperature-control unit to surround and cover the first measuring part and the measuring gap and form a measuring space;
   using an annular duct of the rheometer or rotational rheometer or viscometer located in a region of the temperature-control unit to incorporate a temperature-control medium into the measuring space, and dissipating the temperature-control medium from the hood through at least one exit opening, the annular duct disposed completely around the temperature-control unit and the second measuring part, and the duct having entry openings between the second measuring part and the hood; and
   using the temperature-control unit and the placement of the duct to temperature-control the temperature-control medium in the duct and to effect uniform temperature-control of the first measuring part, of the specimen and of the second measuring part, upon the temperature-control medium flowing through the measuring space.

2. The method according to claim 1, which further comprises:
   configuring the first measuring part with a plate shape or cone shape;
   configuring the second measuring part to be rotationally fixed and plate-shaped;
   configuring the internal contour of the hood to be rotationally symmetrical and surround and cover the second measuring part;
   and
   using at least one entry opening disposed between the annular duct and the measuring space to incorporate the temperature-control medium into the measuring space.

3. The method according to claim 1, which further comprises deflecting the temperature-control medium in the measuring space at an angle, when viewed from the measuring gap toward a rotation axis of the first measuring part, to effect swirling of the temperature-control medium in the measuring space.

4. The method according to claim 3, which further comprises setting the deflecting angle of the temperature-control medium in the measuring space at 15° to 25°.

5. The method according to claim 1, which further comprises:
   partially covering an inside of the hood with a thermal conduction portion of the hood directed into an interior of the measuring space on the inside of the hood; and
   connecting the thermal conduction portion of the hood in a thermally-conducting manner to the temperature-control unit for transporting heat from the temperature-control unit into the interior of the measuring space by way of the thermal conduction portion.

6. The method according to claim 5, which further comprises
configuring the thermal conduction portion of the hood of metal; and
placing the thermal conduction portion of the hood against the temperature-control unit.

7. A rheometer or rotational rheometer for measuring a viscosity of a specimen, the rheometer or rotational rheometer comprising:
a measuring motor;
a measuring shaft rotationally driven by said measuring motor;
a first measuring part fastened to said measuring shaft;
a second measuring part disposed below said first measuring part;
said first measuring part and said second measuring part defining a measuring gap therebetween for receiving the specimen to be examined, said measuring gap having a thickness to be set by adjusting said first and second measuring parts relative to each other;
a heating or temperature-control unit disposed below said second measuring part for temperature-controlling said second measuring part;
said first measuring part and said second measuring part having a common axis and being configured to be driven in a rotating or rotating-oscillating manner relative to each other about said common axis;
a hood having an internal contour bearing on at least one of said second measuring part or said heating or temperature-control unit, said internal contour surrounding and covering said first measuring part and said measuring gap and forming a measuring space;
an annular duct disposed in a region of said temperature-control unit and opening into said measuring space, the annular duct disposed completely around the temperature-control unit and the second measuring part, and the duct having entry openings between the second measuring part and the hood; and
said duct disposed and configured to permit a temperature-control medium in said duct to be temperature-controlled by said temperature-control unit.

8. The rheometer according to claim 7, wherein:
said first measuring part is plate-shaped or cone-shaped;
said second measuring part is rotationally fixed and plate-shaped;
said internal contour of said hood is rotationally symmetrical and surrounds and covers said second measuring part; and
said duct opens into said measuring space through entry openings.

9. The rheometer according to claim 7, wherein:
said measuring shaft has a cylindrical stem at which said first measuring part is fastened to said measuring shaft; and
a circular gap configured as an exit opening for the temperature-control medium is configured between and separates said hood and at least one of said cylindrical stem or said first measuring part from each other.

10. The rheometer according to claim 7, wherein:
said measuring space has an interior;
said hood has an inside and a thermal conduction portion partially covering said inside and being directed on said inside into said interior of said measuring space; and said thermal conduction portion is connected in a thermally conducting manner to said temperature-control unit to permit heat from said temperature-control unit to be transported into said interior of said measuring space by way of said thermal conduction portion.

11. The rheometer according to claim 10, wherein said thermal conduction portion is formed of metal and bears on said temperature-control unit.

12. The rheometer according to claim 7, wherein said hood has at least two parts configured to be form-lockingly interconnected.

13. The rheometer according to claim 12, wherein said common axis is a central axis, and said at least two parts are halves of said hood divisible along said central axis and configured to be plugged into each other by a plug connection.

14. The rheometer according to claim 7, wherein:
said first measuring part has an external contour;
said common axis is a central axis;
said hood has an inside with a contour adapted to said external contour of said first measuring part and following said external contour to form a spacing between said hood and said first measuring part along at least one of said central axis or said contour of said first measuring part.

15. The rheometer according to claim 14, wherein said spacing is 0.5 mm to 1.2 mm in a flow direction of the temperature-control medium.

16. The rheometer according to claim 7, wherein said second measuring part is a screw-on plate configured to be screwed directly onto said temperature-control unit.

17. The rheometer according to claim 7, wherein said duct is formed in at least one of said temperature-control unit or said second measuring part.

18. The rheometer according to claim 17, wherein said duct is concentric with a rotation axis of said first measuring part.

19. The rheometer according to claim 7, wherein:
said hood is rotationally symmetrical;
said duct is configured to allow the temperature-control medium to circulate;
said annular duct is connected to said measuring space by a plurality of entry openings formed between said second measuring part and said hood; and
said hood in a region of said entry openings is configured to deflect the temperature-control medium in said measuring space to permit swirling of the temperature-control medium in said measuring space.

20. The rheometer according to claim 19, wherein said hood in said region of said entry openings has a wall portion inclined at an angle of 15° to 25°, when viewed from said measuring gap, toward a rotation axis of said first measuring part.

21. The rheometer according to claim 7, wherein said hood has a lower side, said second measuring part or said temperature-control unit has a receptacle recess or an annular groove into which said hood is able to be incorporated by way of said lower side, and said hood is coupled to said temperature-control unit in a thermally conductive manner.

22. The rheometer according to claim 7, wherein said hood is formed of a material with a high thermal conductivity or a metal.

23. The rheometer according to claim 7, which further comprises a thermal insulation material surrounding said hood or thermally insulating at least one of said measuring space or said thermal conduction portion relative to an environment of said hood.

* * * * *